May 12, 1942.  C. H. O. WITTIG  2,282,632
SCALE MOUNTING
Filed July 30, 1941

CARL H.O. WITTIG
INVENTOR

Patented May 12, 1942

2,282,632

UNITED STATES PATENT OFFICE 2,282,632

SCALE MOUNTING

Carl H. O. Wittig, Irondequoit, N. Y., assignor to Bausch & Lomb Optical Company, Rochester, N. Y., a corporation of New York Application July 30, 1941, Serial No. 404,634

6 Claims. (Cl. 88—34)

The invention relates to optical instruments such as binoculars, telescopes and the like and more especially is concerned with scale means, such as a mil scale, which are associated with instruments of this character.

One important object of my invention resides in the provision of novel means for mounting a reference scale in an optical instrument, which means lacks the defects inherent in prior art practices. Another object is to provide an adjustable mounting for scale means, such as a mil scale, whereby location of the scale means at some position with respect to a lens of a binocular may be simply and quickly accomplished. A further object is to employ a reference scale which is slidable along the optical axis of the instrument with which it is associated and which is carried by a mounting movable in a plane parallel to such optical axis. Yet a further object of the invention is to devise a mil scale mount for use with an optical instrument, which mount is adjustable on guide means upon the actuation of an adjustable stop against which the mount is normally urged by yieldable pressure exerting means.

With these and other objects in view which may be incident to my improvements, the invention consists in the parts and combinations to be hereinafter set forth and claimed, with the understanding that the several necessary elements comprising my invention may be varied in construction, proportion and arrangement without departing from the spirit of the invention or exceeding the scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

Figure 1:
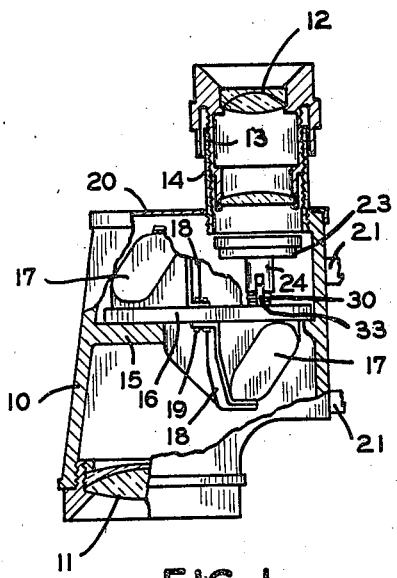
Figure 1 is a sectional elevation of one of the body tubes of a prism binocular and shows the optics associated therewith.
Figure 2:
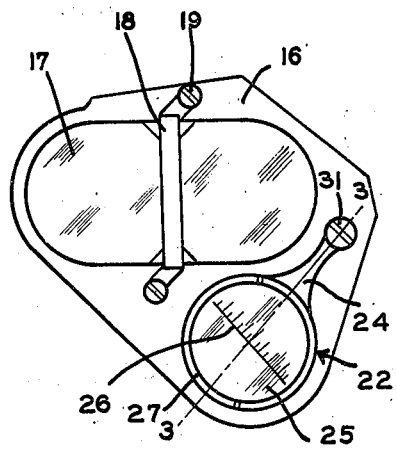
Figure 2 is a plan view of a prism table used with the binocular of Figure 1 and discloses a prism and the scale means of my invention supported thereon.
Figure 3:
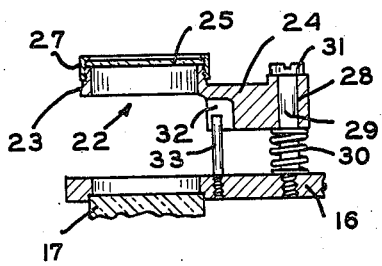
Figure 3 is a sectional elevation on the line 3—3 of Figure 2 and shows the mounting for the scale means in detail.

In the drawing, wherein similar reference characters indicate like parts in the different views, I have shown a sectional elevation of a body tube 10 of a binocular. The ends of the body tube 10 are closed by an objective 11 and an ocular 12, the lens mounts for which are of conventional design and are secured to the body tube in the usual manner. As shown, the ocular 12 is formed with an internal sleeve 13 which carries the eye lenses and the eyecup of the ocular. Sleeve 13 is threaded into an external sleeve 14 in a manner to be adjustable lengthwise of the latter and sleeve 14 is in turn threaded into the body tube so as to be detachable therefrom. Focusing of the ocular is effected by rotating the eyecup which causes movement of the sleeve 13 and the eye lenses carried thereby.

Within the body tube is a shelf 15 to which a prism table 16 is adapted to be secured by any well known means. A Porro prism 17 is held upon the table 16 by straps 18 which are fastened to the table by screws 19. The ocular end of the body tube 10 is provided with a removable cover 20 which closes that end thereof except for an opening therein through which opening the ocular 12 is adapted to extend. Suitable screws, not shown, are employed for fastening the cover 20 to the body tube.

The structure hereinbefore described provides a conventional housing and mounting for the left hand optical system of a binocular, the optical axis of which passes in the usual manner through the objective 11, prism 17 and adjustable focus ocular 12. A second body tube, not illustrated in the drawing but substantially like the body tube 10, is provided to carry a set of optics for the right hand optical system of the instrument. Elements for the second set of optics comprise an objective, a Porro prism and an ocular, all of which are substantially similar to the elements already described.

The left and right hand body tubes may be connected in any well known manner to provide a binocular instrument. For this purpose bridge members 21, shown on the left hand body tube 10, may be cast integrally with each body tube and may have their free ends hinged to each other by the usual hinge pin connection (not shown) so as to permit the interpupillary distance beween the eyecups of the binocular to be adjusted at will.

As may be noted, the binocular construction which I have disclosed provides independently focusing oculars. However, as will become apparent, the mil scale mounting which I am about to describe may be used with a center focusing type of binocular wherein both oculars are simultaneously focused by actuation of a knurled knob or finger piece, although, as is usually the case with binocular design of this character, one of the oculars is also adjustable independently of the common focusing mechanism.

For certain uses, as for example where the instrument is employed for military purposes, it is highly desirable to mount a reference scale within one of its body tubes, usually in the left hand optical system. Scales of this nature, generally of the character of mil scales, are especially useful in directing artillery fire. The scale itself is laid out in linear units and is etched, engraved or otherwise formed upon a surface of a transparent member carried by a suitable mount which latter is supported within a body tube. It is customary, for the purpose of avoiding parallax, to position the mil scale in the focal plane of the objective so that it is optically located at infinity.

While the just described practice is successful in that it overcomes parallax, the mechanical means heretofore employed for carrying it into effect have possessed certain disadvantages. These disadvantages reside in tedious and time taking operations which require a cut and try method of adjustment for locating the scale means in the desired plane. For example, one prior art construction seats the mil scale mount on a number of washers and locates the scale in the desired position by suitably varying the thickness of the seat for the mil scale mount until tests of the instrument show that the scale and the image of the object are in focus. This procedure involves removing or adding washers to the seat for each position tried for the scale mount and in addition requires the removal of the scale mount from the body tube to effect a change in the elevation of its seat as well as the reseating of the mount subsequent to such a change.

To avoid these inherent defects of the prior art, I make use of simple means for mounting a mil scale so that it may be adjusted with great ease and facility. For this purpose, I employ a mounting, designated in general by the reference numeral 22, which is comprised of the seat portion 23 for supporting the scale means and an arm or bracket 24 which extends from the seat portion and which is employed in slidably supporting the scale mount. For scale means I employ a transparent member 25, usually shaped in the form of a flat disk, which is made of some suitable material such as glass or plastic and which has scale indicia such as the mil scale 26 etched, engraved or otherwise placed on a face thereof. The transparent member or scale disk 25 may be held upon its seat by suitable means, for example, by the retaining ring 27.

A bore or passageway 28 extends through the end of the arm 24 most distant from the scale means and provides a bearing or slide which slidably engages a guide member in the form of a round post 29 which latter is screwed or otherwise secured to the prism table. As may be observed, a spring 30 is slipped over the post. This spring provides a yieldable seat for the mounting 22 and normally urges it against an adjustable stop 31, the position of the latter determining the setting of the scale mount. The adjustable stop 31 is in the form of a screw which is adapted to engage with an internally threaded hole, not detailed in the drawing but extending within the post 29 for a short distance from its free end.

It will be apparent in this construction that by making the spring 30 sufficiently strong, it will constantly urge the scale mounting 22 against the stop and will provide means for firmly and securely holding the mounting at a desired position. Due to the spring, as the stop is moved away from the end of the post 29, the scale mount will slide along the post in a like direction or away from the prism table 16. On the other hand, opposite rotation of the stop screw 31 from that described will move the mounting for the mil scale towards the prism table 16 and against the action of the spring 30 which is compressed by this movement. In this manner the adjustment of the stop and the action of the spring are utilized to set the scale means.

Adjusting movement of the scale mount on its post may be utilized to locate the plane of the mil scale 26 in the focal plane of the objective 11 assuming the scale mount 22 to be so formed and oriented and the post 30 to be so located that the optical axis of the instrument will pass through the center of the transparent member 25 and will be normal to the plane of such member in which the scale indicia is located and further assuming that the scale mount is given a range of movement to include positions on either side of the focal plane of the objective. Upon fulfillment of these conditions, it will be appreciated that the shape of the mounting 22 and the angular relation of the bore 28 and the post or guide 29 to the prism table 16 will be immaterial.

In the form illustrated, the seat portion 23 of the scale mount is of cylindrical shape while the arm 24, which has a substantially rectangular cross section, extends from the seat portion in a straight line and is symmetrically positioned thereto. With this design, the axis of the post 29 is located in a plane which is normal to the prism table 16 and which is parallel to the optical axis of the instrument. Hence if the axis of the bore 28 in the scale mount is normal to the transparent member or scale disk 25, then the plane of the latter as well as the plane of the mil scale will be normal to the optical axis. By suitably choosing the overall length of the mounting 22 and the postion of the post 29, the optical axis of the instrument will pass through the center of the transparent member 25 when the scale mount is properly oriented. Thus it may be observed that the scale mount 22 moves in a plane which is parallel to the optical axis, that is to say, in the plane of the axis of its post or guide member 29, while the mil scale 26 moves along the optical axis.

Suitable means are provided to maintain the mil scale in its proper orientation by preventing the rotation of the mounting 22 on its post 29 while permitting the scale mount to be slidably adjustable. One practice utilizes a recess or slot 32 formed in the side of the arm 24 of the scale mount which is nearest the prism table 16 and at the end of the arm which is nearest the scale means. Slot 32 engages the upper portion of guide means, such as a pin 33, the lower end of which may be threaded to engage with the threads of a hole formed in the prism table. As shown, the pin 33 is located so that its axis is parallel to that of the post 29. By choosing the width of slot 32 so as to provide a sliding fit with the pin 33, it will be apparent that rotation of the scale mount will be effectively prevented.

Generally, a collimator is used to carry out the adjustment of the scale means although it is possible to effect this adjustment when sighting the objective on a distant object in a manner well known to those skilled in the art. The binocular tube which carries the mil scale, but without the cover 20 and ocular 12 thereon, is mounted for testing and the objective 11 is sighted on the target of the collimator to form an image thereof. It is then merely necessary to turn the stop screw 31, by the simple means of a screw driver, to move the scale mount in one direction or another until the scale means carried thereby appears in sharpest focus with the image of the target. By satisfaction of this condition, the scale means are suitably located in the focal plane of the objective.

Under some circumstances, it may be desirable to fix the mil scale in some plane other than the focal plane of the objective as, for example, where working specifications for the instrument call for bringing the scale into focus with the objective at some distance less than infinity. In such case, it is a simple matter to adjust the scale means to whatever position may be desired, it being understood that practice of this nature is to be included within the concept of my invention.

It is to be observed that the ease of assembly and adjustment of the mil scale mount into operating position, possesses yet another advantage in that it permits ready interchange of one scale mount for a new one, as where a mil scale becomes broken in the course of service in the field.

By reason of the structure which I have disclosed, it will be evident that I have accomplished the aims of my invention in that I have provided an easily adjusted scale means for a binocular. At the same time, I have disclosed a scale mount of a sturdy design which is slidable along the optical axis of an optical instrument and which when set in adjusted position is securely held against displacement therefrom.

I claim:

1. In a binocular, the combination of a body tube, an objective mounted on the body tube, transparent scale means movably carried by said body tube and positioned substantially in the focal plane of said objective, means carried by said body tube for supporting said scale means comprising a mounting slidably mounted to move in a plane substantially parallel to the optical axis of the objective, an adjustable stop for said mounting and yieldable means normally urging the mounting against said stop whereby said scale means may be adjusted relative to the objective.

2. In an optical instrument, the combination with a body tube having an objective and an ocular mounted at its opposite ends, of transparent scale means adjustable along the optical axis of the instrument while being maintained in substantially perpendicular relation thereto whereby to locate said scale means substantially in a plane to appear at infinity to an observer who is using the instrument and means supporting said scale means comprising, a mounting for the scale means, a guide carried by said body tube to extend in parallel relation to said optical axis, said mounting being slidable upon said guide, an adjustable stop associated with said guide to adjustably limit the sliding movement of said mounting and yieldable means normally urging said mounting against said stop.

3. In a binocular, the combination of a body tube, an objective mounted on the body tube, transparent scale means movably carried by said body tube for location substantially in the focal plane of said objective, means for supporting said scale means comprising a mounting therefor which is movable in a plane substantially parallel to the optical axis of the objective, an adjustable stop for said mounting, yieldable means normally urging the mounting against said stop, and guide means carried by said body tube in sliding engagement with said mounting whereby to maintain the mounting in said plane parallel to the optical axis.

4. In a binocular, the combination of a body tube, an objective at one end thereof and transparent scale means movably carried by the body tube for adjustment along the optical axis of the objective to occupy a position substantially in the focal plane of the objective, means for supporting said scale means comprising a scale mount on which the scale means are carried, a guide located in said body tube substantially parallel to the optical axis of the objective, an arm on said mount in sliding engagement with said guide, an adjustable stop on said guide, and yieldable means associated with said guide for normally urging the arm of said mount against said stop.

5. A scale mount for use with an optical instrument of the type comprised of a body tube with an objective and an ocular at its opposite ends, said scale mount having a support portion, transparent scale means carried by said support portion, a guide located in said body tube in substantially parallel relation to the optical axis of the instrument, said mount slidably engaged with said guide, said transparent scale means on said support carried in substantially perpendicular relation to said guide and located to move along said optical axis, an adjustable stop on said guide, yieldable means associated with said guide for normally urging said mount against said stop, and a second guide carried by said body tube and slidably engaged by said mount whereby to hold the mount against movement about said first named guide.

6. In an optical instrument, the combination with a body tube having an objective and an ocular at opposite ends thereof and a prism shelf within the body tube between the objective and the ocular of a scale mount, a transparent member having indicia formed on a face thereof, said transparent member engaged by said scale mount and supported in a position to have the optical axis of the instrument pass therethrough, a post on said shelf extending in parallel relation to said optical axis, said scale mount provided with an opening therethrough, said post extending within said opening and slidably engaged by said scale mount, the post and opening being located with respect to each other to position said face of the transparent member in a plane substantially perpendicular to said post, an adjustable stop on said post, spring means on said post normally urging the scale mount against said stop, said scale mount provided with a recess, and a pin mounted on said shelf, said recess and pin engaged in sliding relation to each other.

CARL H. O. WITTIG.